United States Patent [19]

Smith

[11] Patent Number: 4,468,000
[45] Date of Patent: Aug. 28, 1984

[54] CONTROL ROD DRIVE MECHANISM VENT VALVE ASSEMBLY

[75] Inventor: Robert C. Smith, Bremen, Ohio

[73] Assignee: The Babcock & Wilcox Company, New Orleans, La.

[21] Appl. No.: 288,243

[22] Filed: Jul. 29, 1981

Related U.S. Application Data

[63] Continuation of Ser. No. 87,896, Oct. 24, 1979.

[51] Int. Cl.³ ............................................... F16K 1/14
[52] U.S. Cl. ..................................... 251/84; 251/321; 137/DIG. 2
[58] Field of Search ................. 137/DIG. 2; 251/321, 251/84

[56] References Cited

U.S. PATENT DOCUMENTS

| | | | |
|---|---|---|---|
| 625,338 | 5/1899 | Kolben | 137/DIG. 2 |
| 721,763 | 3/1903 | Wehner et al. | 137/DIG. 2 |
| 1,182,166 | 5/1916 | Graham | 137/DIG. 2 |
| 1,317,885 | 10/1919 | Morris | 137/DIG. 2 |
| 4,087,986 | 5/1978 | Grahl | 251/321 X |

Primary Examiner—A. Rosenthal
Attorney, Agent, or Firm—Vytas R. Matas; Robert J. Edwards

[57] ABSTRACT

A closure insert assembly (10) for a control rod drive mechanism that has incorporated therein a vent valve arrangement which permits the release of air trapped in the nuclear reactor during the filling of the primary coolant system therein and allows the entrance of air into the reactor for the draining of same. To accomplish this, the vent valve is of the ball type which engages two oppositely disposed conical ball seats (44, 70), one of which is allowed to move laterally with respect to the other, causing the ball (66) and ball seats (44, 70) to be "self-centering" and resulting in a uniform compressive force being applied over minor circumferences on the ball (66). The use of conical ball seats (44, 70), one of which is laterally movable, also permits the axes of the conical ball seats (44, 70) to be non-parallel and/or non-concentric without hindering the operation and effectiveness of the vent valve.

8 Claims, 4 Drawing Figures

CONTROL ROD DRIVE MECHANISM VENT VALVE ASSEMBLY

This is a continuation of application Ser. No. 06/087,896, filed 10-24-79.

TECHNICAL FIELD

The present invention relates generally to a device for closing a tubular object and more particularly to a device having venting means incorporated therein and used for closing a control rod drive mechanism which is installed on a nuclear reactor.

BACKGROUND ART

A type of nuclear reactor known as a Pressurized Water Reactor uses water, which is maintained at a high pressure and which is caused to circulate through the reactor primary coolant system, as a means of removing the heat generated by the nuclear fuel in the reactor core. The filling of the primary coolant system in this type of reactor is not without its problems. During the filling operation, as the water level rises above the level of the coolant system circulation pipes, the air remaining in the upper portions of the reactor vessel, the vessel head, and the control rod drive mechanism becomes trapped preventing complete filling of the coolant system. In order to complete the filling operation, the closure devices used for the control rod drive mechanisms must be vented to allow the trapped air to escape. Similarly, when the water level in the coolant system must be reduced as, for example, at refueling time, the closure devices must be vented to allow air to enter the control rod drive mechanisms so that the cooling water can be rapidly drained from the reactor. In order to accomplish this venting operation, vent valves have typically been incorporated into the closure devices. Through repeated use and because of inherent design problems, after a period of time these vent valves may not seat properly and can require excessive maintenance, repair, or replacement resulting in increased exposure of maintenance personnel to nuclear radiation due to the time required to perform such functions. In addition, in most instances these valves require the use of a special venting tool to operate same.

Because of this, it has become desirable to develop a closure assembly for a control rod drive mechanism that has venting means incorporated therein and which retains proper sealing capabilities after repeated use and does not require a special venting tool to operate same.

SUMMARY OF THE INVENTION

The present invention solves the aforementioned problems associated with the prior art as well as other problems by providing a closure device that has an improved vent valve incorporated therein. The vent valve is comprised of a conical sealing ball seat in the body portion of the closure device, a spring loaded ball, and a floating conical force application ball seat in the vent nut which is threadably attached to the body portion. Since conical ball seats are used and inasmuch as one of the seats is "floating", the included angle of each ball seat is not critical and does not have to be the same for both ball seats, and the axes of the ball seats do not have to be parallel or concentric. The ball seat axes must, however, intercept the center of the ball and this happens automatically since the floating ball seat in the vent nut results in a "self-centering" seat and ball combination which compensates for any reasonable lack of alignment between valve components. Inasmuch as the floating ball seat and ball are "self-centering", a uniform compressive force is applied to the ball resulting in the minimization of any compressive damage to the ball seats and the ball even after repeated usage. In addition, the line contact established between the floating ball seat and the ball allows the application of a substantially greater force to the ball than if the force is applied to the ball by a flat surface. This greater force assures a tight seal at the line contact between the ball and the fixed conical ball seat in the valve body.

In view of the foregoing, it will be seen that one aspect of the present invention is to provide an improved vent valve for a closure device used for sealing a control rod drive mechanism installed on a nuclear reactor.

Another aspect of the present invention is to provide a vent valve that uses two (2) conical ball seats and a spring-loaded ball resulting in the application of an evenly distributed compressive force over minor circumferences of the ball.

Still another aspect of the present invention is to provide a vent valve that uses conical ball seats, one of which is "floating" resulting in a "self-centering" combination of the seat and ball which compensates for any reasonable lack of alignment between valve components and permits the axes of the ball seats to be non-parallel and/or non-concentric.

These and other aspects of the invention will be more clearly understood after a review of the following description of the preferred embodiment when considered with the following drawings.

DESCRIPTION OF THE PREFERRED EMBODIMENT

Figure 1:
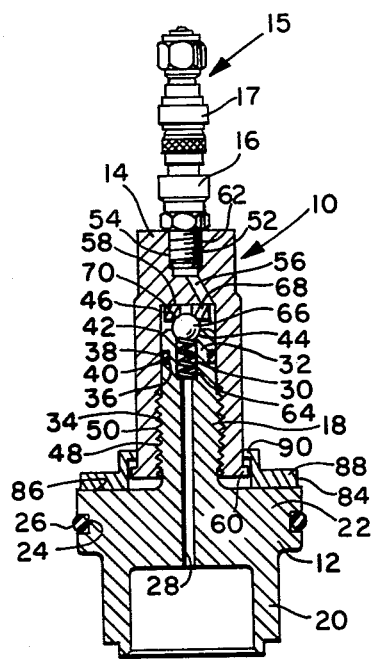
FIG. 1 is a cross-sectional view of the present invention.

Referring now to the drawings wherein the illustrations are for the purpose of describing the preferred embodiment of the invention and are not intended to limit the invention hereto, FIG. 1 shows a cross-sectional view of a closure insert assembly 10 which is attachable to the top of a control rod drive mechanism. A plurality of such control rod drive mechanisms, each of which includes such a closure insert assembly 10, are attached to the top of a nuclear reactor vessel head. Closure insert assembly 10 is composed of a body 12, a vent nut 14 which is threadably received on body 12, and a vent plug 15, the end of which is threadably attached to vent nut 14.

Body 12 is comprised of an upper hub portion 18, a lower hub portion 20, and an intermediate hub portion 22. An annular groove 24 is provided in intermediate hub portion 22 to receive an O-ring 26 which provides a sealing surface when closure insert assembly 10 is installed in a control rod drive mechanism. An axially extending bore 28 is provided in body 12 and intersects a counterbore 30 provided in the end 32 of upper hub portion 18. Threads 34 are provided on the portion of the axial length of upper hub portion 18 adjacent intermediate hub portion 22. An annular groove 36 is provided in the portion of upper hub portion 18 adjacent the end thereof. An O-ring 38 and a back-up washer 40 are provided in annular groove 36 to provide a sealing surface with vent nut 14 when closure insert assembly 10 is in its fully assembled condition. The end 32 of upper hub portion 18 has a chamfered surface 42 to aid in the insertion of upper hub portion 18 into vent nut 14 during assembly. A conical ball seat 44 is provided in the end 32 so as to intersect counterbore 30. There is no requirement that the included angle of conical ball seat 44 be a particular angle and may be any angle within a large angular range. In addition, the axis of conical ball seat 44 need not be concentric with or even parallel to the longitudinal axis of body 12.

Vent nut 14 has provided therein a blind bore 46 having a diameter slightly larger than the diamter of upper hub portion 18 of body 12. A counterbore 48 is provided in one end of blind bore 46 and has threads 50 formed therein of the same pitch as threads 34 on upper hub portion 18 of body 12 so as to mate therewith when in the assembled condition. A blind bore 52 having threads 54 formed therein is provided in the end of vent nut 14 opposite the end in which blind bore 46 is formed. A passageway 56 is provided between the end of blind bore 52 and a surface 58 formed at the end of blind bore 46 allowing for the passage of air from or to the control rod drive mechanism after closure insert assembly 10 has been installed therein. The end of vent nut 14 in which blind bore 46 is formed also has a flanged surface 60 formed therein which is used for limiting the axial movement of vent nut 14 during the venting process hereinafter described.

Vent plug 15 is comprised of a standard quick-connect body assembly 16 and a mating quick-connect shut-off stem assembly 17. Body assembly 16 is typically similar to Swagelok Tube Fitting Part No. QC4-B-4AN and has threads 62 formed on one end thereof of the same pitch as threads 54 provided in blind bore 52 of vent nut 14. Shut-off stem assembly 17 is also a standard commercially available component and is similar to Swagelok Part No. QC4-D-400. Body assembly 16 is threadably connected to vent nut 14 by means of threads 62, 54 and shut-off stem assembly 17 is disconnected therefrom to permit venting of the nuclear reactor vessel as will be hereinafter described.

The valve mechanism contained within closure insert assembly 10 is comprised of a spring 64, a ball 66, and a valve member 68. Spring 64 is received in counterbore 30 in upper hub portion 18 of body 12 and is of sufficient length to protrude slightly outwardly of counterbore 30 when in the free state. Valve member 68 has an outer diameter less than the diameter of bore 46 in vent nut 14 and has a conical ball seat 70 formed therein. Valve member 68 is positioned in bore 46 so that the surface opposite conical ball seat 70 contacts surface 58 formed in the end of blind bore 46. Ball 66 is interposed between conical seats 44, 70 and compresses spring 64 when closure insert assembly 10 is in its fully assembled condition. As is the case with ball seat 44, the included angle of conical ball seat 70 may be any angle within a large angular range and does not have to be the same as the included angle for ball seat 44. In addition, the axes of conical ball seats 44 and 70 do not have to be parallel or concentric. The only requirement is that the axes of these seats must intercept the center of ball 66 and this happens automatically when closure insert assembly 10 is assembled since valve member 68 can move relative to surface 58 to compensate for any lack of alignment between valve components and/or non-normality of surface 58 with respect to the axis of body 12. In addition, because of the ability of valve member 68 to move laterally with respect to surface 58, a "self-centering" seat and ball combination results thus insuring the application of a uniform compressive force to ball 66. Thus, ball 66 is always properly seated with respect to conical ball seats 44, 70. In addition, since conical seats are used, line contact rather than point contact with the ball results, allowing the application of a greater compressive force to the ball insuring a tight seal without damage to the ball or the ball seats.

Figure 2:
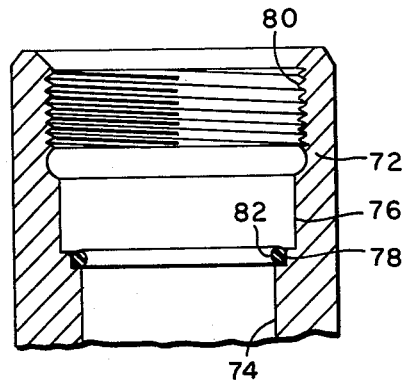
FIG. 2 is a cross-sectional view of the top portion of a typical control rod drive mechanism to be sealed and vented by the present invention.

The end of a typical control rod drive mechanism to be closed is shown in FIG. 2 and is usually a tubular housing 72 having a first bore 74 which intersects a second bore 76 forming a shoulder 78. First bore 74 has a diameter slightly greater than that for the lower hub portion 20 of body 12 while second bore 76 has a diameter slightly greater than that for intermediate hub portion 22 of body 12. A portion of second bore 76 adjacent the end of tubular housing 72 has threads 80 formed therein to provide means for retaining the closure insert assembly 10 therewithin.

Figure 3:
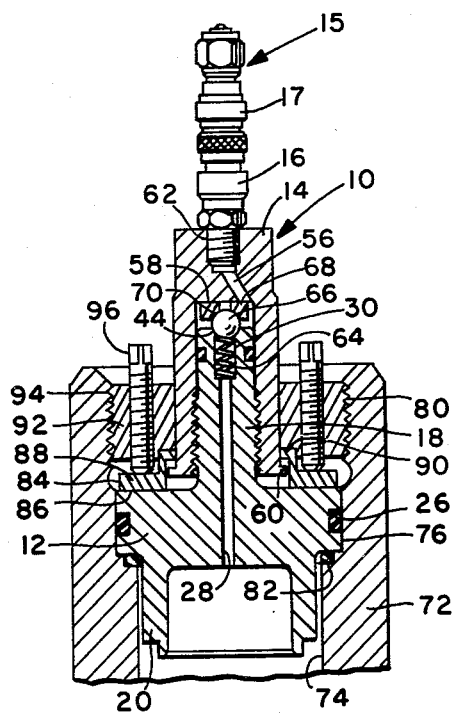
FIG. 3 is a cross-sectional view of the present invention threadably attached to a typical control rod drive mechanism and illustrates the relative position of the ball with respect to the conical ball seats when the vent valve is in the closed position.

Prior to insertion of closure insert assembly 10 into tubular housing 72, an O-ring 82 is received within second bore 76 and positioned therein so as to contact shoulder 78. When closure insert assembly 10 is inserted into tubular housing 72, positive seals are provided by O-rings 26, 82 between body 12 and tubular housing 72, as shown in FIG. 3. After insertion of closure insert assembly 10 into housing 72, a retaining ring 84 is received over vent nut 14 and positioned so as to contact transverse surface 86 on body 12. Retaining ring 84 is comprised of a base portion 88 having an inner diameter slightly greater than the outer diameter of flanged surface 60 on vent nut 14, and a boss-like portion 90 axially offset from base portion 88 and having an inner diameter smaller than the outer diameter of flanged surface 60 on vent nut 14 but greater than the outer diameter of vent nut 14. The axial offset of the boss-like portion 90 with respect to base portion 88 is sufficient to allow for the partial unthreading of vent nut 14 with respect to body 12 when in the assembled condition.

Closure insert assembly 10 is retained within tubular housing 72 by means of an abutment ring 92 which is received over vent nut 14 and which has threads 94 on the outer periphery thereof of the same pitch as threads 80 in second bore 76 of tubular housing 72 so as to mate therewith. A plurality of jacking screws 96 are provided on a bolt circle in abutment ring 92 and are threadably advanceable therein so as to contact and compress retaining ring 84 when in the assembled state. Such compression results in the compression of O-ring 82 and the positive sealing of tubular housing 72 by closure insert assembly 10 and thus the positive sealing of the control rod drive mechanism.

Figure 4:
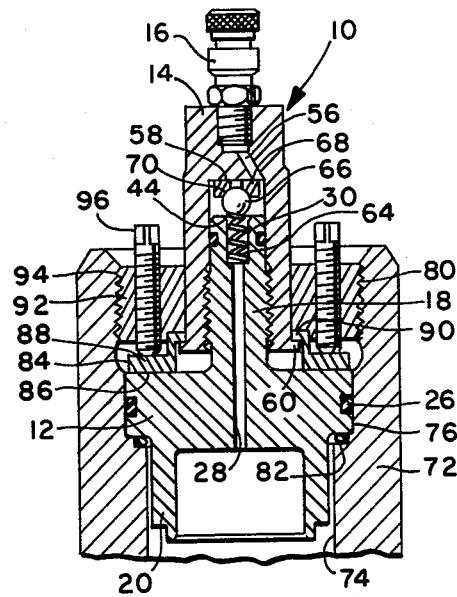
FIG. 4 is a cross-sectional view of the present invention, similar to that of FIG. 3, and illustrates the relative position of the ball with respect to the conical ball seats when the vent valve is in the open position.

Typically, when closure insert assembly 10 is installed in the tubular housing 72 of a control rod drive mechanism, ball 66 firmly engages conical ball seats 44, 70 preventing air from entering into or escaping from the control rod drive mechanism. If, however, water is to be added to the reactor primary coolant system, shut-off stem assembly 17 is disconnected from body assembly 16 and vent nut 14 is threadably retracted on body 12 until flanged surface 60 on vent nut 14 contacts boss-like portion 90 of retaining ring 84, as shown in FIG. 4. The amount of retraction permitted is sufficient to allow spring 64 to expand resulting in ball 66 moving away from conical ball seat 44. This movement of ball 66 provides a passageway for the exit of air from the control rod drive mechanism thus insuring that the coolant system can be properly and completely filled. After the coolant system has been filled, vent nut 14 is threadably advanced on body 12 causing ball 66 to compress spring 64 and firmly engage conical ball seat 44 thus closing the valve mechanism preventing any further air from entering into or escaping from the control rod drive mechanism. Shut-off stem assembly 17 is then reconnected to body assembly 16. A similar approach is taken, i.e., stem assembly 17 is disconnected from body assembly 16 and vent nut 14 is loosened on body 12 causing ball 66 to disengage conical valve seat 44, in order to allow air to enter the control rod drive mechanism. This operation is necessary when the coolant water level in the reactor must be reduced such as at refueling time. The introduction of air at that time greatly assists in speeding the coolant water removal process.

Certain modifications and improvements will occur to those skilled in the art upon reading the foregoing description. It will be understood that all such improvements and modifications have been deleted herein for the sake of conciseness and readability but are properly within the scope of the following claims.

I claim:

1. A vent valve for periodically venting fluid from a control rod drive device of a nuclear reactor comprising a first valve seat within said device, said first valve seat having a conical seating surface formed therein and an orifice passing through said valve seat and intersecting said conical seating surface, a second valve seat within said device located proximately to an inner wall of said device and oppositely disposed from said first valve seat, said second valve seat having a conical seating surface formed therein, a ball interposed between said first valve seat and said second valve seat, spring means for biasing said ball away from said conical seating surface in said first valve seat to allow longitudinal movement of said first valve seat relative to said second valve seat to provide selective engagement and disengagement of said ball with said first valve seat causing the closing and opening of said orifice regulating the flow of fluid therethrough, a horizontal wall surface in said vent valve spaced from said second valve seat surface, said second valve seat being free floating with respect to the inner walls of said vent valve to allow said second valve seat to be movable along said horizontal wall surface of said vent valve to align itself with respect to said first valve seat causing said ball to be self-centering with respect to said first valve seat when said first and second valve seats are moved longitudinally with respect to each other to engage and disengage said ball with said first valve seat.

2. The ball valve as defined in claim 1 wherein said self-centering of said ball with respect to said valve seats causes said valve seats to contact said ball along minor circumferences thereon.

3. The ball valve as defined in claim 1 wherein relative longitudinal movement of said valve seats toward each other causes said valve seats to engage said ball closing said orifice preventing the flow of fluid therethrough.

4. The ball valve as defined in claim 1 wherein relative longitudinal movement of said valve seats away from each other causes said biasing means to urge said ball away from said first valve seat opening said orifice permitting the flow of fluid therethrough.

5. The ball valve as defined in claim 1 wherein said longitudinal movement of said first valve seat with respect to said second valve seat is permitted through a predetermined distance sufficient to allow the selective engagement and disengagement of said ball with said valve seats.

6. The ball valve as defined in claim 1 wherein one of said valve seats is integrally formed in said device.

7. The ball valve as defined in claim 1 wherein the included angle of said conical seating surfaces provided in said first valve seat and said second valve seat may be any angle within a predetermined range of angles.

8. The ball valve as defined in claim 1 wherein the included angles of said conical seating surfaces provided in said first valve seat and said second valve seat differ.

* * * * *